United States Patent
Chen

(10) Patent No.: US 10,304,461 B2
(45) Date of Patent: May 28, 2019

(54) REMOTE ELECTRONIC SERVICE REQUESTING AND PROCESSING METHOD, SERVER, AND TERMINAL

(71) Applicant: Tencent Technology (Shenzhen) Company Limited, Shenzhen, Guangdong (CN)

(72) Inventor: Hao Chen, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 15/651,677

(22) Filed: Jul. 17, 2017

(65) Prior Publication Data

US 2017/0316781 A1  Nov. 2, 2017

Related U.S. Application Data

(63) Continuation of application No. PCT/CN2016/072140, filed on Jan. 26, 2016.

(30) Foreign Application Priority Data

Feb. 13, 2015 (CN) .......................... 2015 1 0078377

(51) Int. Cl.
  *G10L 15/30* (2013.01)
  *H04L 29/08* (2006.01)
  *G10L 15/22* (2006.01)

(52) U.S. Cl.
  CPC .............. *G10L 15/30* (2013.01); *G10L 15/22* (2013.01); *H04L 29/08* (2013.01); *G10L 2015/223* (2013.01)

(58) Field of Classification Search
  CPC ................................. G10L 15/30; G10L 15/22
  (Continued)

(56) References Cited

U.S. PATENT DOCUMENTS 6,192,338 B1 * 2/2001 Haszto .................... G10L 15/30
  704/257
7,409,349 B2 * 8/2008 Wang .................... G06F 17/218
  704/270

(Continued)

FOREIGN PATENT DOCUMENTS

CN       101681459       3/2010
CN       103081004       5/2013
(Continued)

OTHER PUBLICATIONS

International Search Report and Written Opinion (Translation) for corresponding PCT/CN2016/072140 dated Apr. 12, 2016.

*Primary Examiner* — Shaun Roberts
(74) *Attorney, Agent, or Firm* — Brinks Gilson & Lione

(57) ABSTRACT

The present disclosure relates to remote service requesting and processing. The method includes: receiving a service processing request sent by a terminal; recognizing voice data in the service processing request to obtain voice recognition information; and sending the voice recognition information and an Internet application identifier to a corresponding third-party server according to a public identifier, so that the third-party server processes a corresponding service according to the voice recognition information. The voice data in the service processing request sent by the terminal is recognized to obtain the voice recognition information. The voice recognition information and the Internet application identifier are sent to the third-party server, so that the third-party server processes the corresponding service according to the voice recognition information.

18 Claims, 10 Drawing Sheets

(58) Field of Classification Search
USPC .................................. 704/270, 270.1, 275
See application file for complete search history.

(56) References Cited

U.S. PATENT DOCUMENTS

| | | | | |
|---|---|---|---|---|
| 8,224,650 | B2* | 7/2012 | Galanes | H04M 1/72561 |
| | | | | 704/270.1 |
| 8,296,148 | B1* | 10/2012 | Fox | H04L 65/1069 |
| | | | | 379/88.01 |
| 8,370,160 | B2* | 2/2013 | Pearce | G10L 15/24 |
| | | | | 704/270.1 |
| 2002/0046035 | A1* | 4/2002 | Kitahara | G10L 15/1822 |
| | | | | 704/277 |
| 2006/0100881 | A1* | 5/2006 | He | G10L 15/22 |
| | | | | 704/270 |
| 2009/0049136 | A1* | 2/2009 | Jaiswal | H04L 41/00 |
| | | | | 709/206 |
| 2015/0088506 | A1* | 3/2015 | Obuchi | G10L 15/32 |
| | | | | 704/236 |
| 2015/0149168 | A1* | 5/2015 | Stent | G06F 17/243 |
| | | | | 704/235 |

FOREIGN PATENT DOCUMENTS

| | | |
|---|---|---|
| CN | 103902373 | 7/2014 |
| CN | 103915095 | 7/2014 |
| CN | 103956169 | 7/2014 |
| CN | 104123686 | 10/2014 |
| CN | 104683456 | 6/2015 |
| WO | WO 2008125032 | 10/2008 |
| WO | WO 2015018241 | 2/2015 |

* cited by examiner

REMOTE ELECTRONIC SERVICE REQUESTING AND PROCESSING METHOD, SERVER, AND TERMINAL

RELATED APPLICATIONS

This application is a continuation of International Patent Application PCT/CN2016/072140, filed Jan. 26, 2016, which claims priority to Chinese Patent Application No. 201510078377.3, entitled "SERVICE PROCESSING METHOD, SERVER, AND TERMINAL", filed with the Chinese Patent Office on Feb. 13, 2015, both of which are incorporated herein by reference in their entirety.

FIELD OF THE TECHNOLOGY

The present disclosure relates to the field of Internet technologies, and in particular, to a remote electronic service requesting and processing method, a server, and a terminal.

BACKGROUND OF THE DISCLOSURE

With rapid development of science and technology, when using an application program, a user may enter voice data, to request a corresponding service. For example, a user may enter voice data for querying weather information, when using an electronic weather service. In processing a service request, voice data usually needs to be processed to obtain corresponding voice recognition information. A subsequent service may then be processed according to the voice recognition information. A procedure of processing a service related to voice data affects user experience and is the key to improving user experience.

A service processing method based on voice recognition is provided in a related technology and method. In the method, a terminal obtains voice data entered by a user, and sends the voice data to a voice recognition server. After receiving the voice data, the voice recognition server process and recognizes the voice data to obtain voice recognition information, and returns the voice recognition information to the terminal. After the terminal receives the voice recognition information and detects an information processing instruction entered by the user, the terminal sends the voice recognition information to a third-party server, so that the third-party server processes a corresponding service according to the voice recognition information.

In implementation of the present disclosure, the inventor finds that the foregoing method has at least the following problem:

When processing a service based on voice input, a terminal needs to first send voice data to a voice recognition server, and then send voice recognition information to a third-party server after receiving the voice recognition information returned by the voice recognition server. Then, the third-party server processes a corresponding service. Therefore, the service processing process is relatively complex. Therefore, efficiency of such service processing is relatively low.

SUMMARY

To resolve the problem in the related technology, embodiments of the present invention provide a service processing method, a server, and a terminal. The technical solutions are as follows:

According to a first aspect, a service processing method is provided, used by an Internet application server, applied to a scenario in which a third-party server exchanges information with a terminal by using the Internet application server, the terminal exchanging information with the Internet application server by using an Internet application identifier, the third-party server exchanging information with the Internet application server by using a public identifier, the public identifier and the Internet application identifier being identifiers registered with the Internet application server, and the method including:

receiving a service processing request sent by the terminal, the service processing request including at least voice data, the public identifier, and the Internet application identifier;

recognizing the voice data in the service processing request to obtain voice recognition information; and sending the voice recognition information and the Internet application identifier to the third-party server corresponding to the public identifier, so that the third-party server processes a corresponding service according to the voice recognition information and the Internet application identifier.

According to a second aspect, a service processing method is provided, used by a terminal, applied to a scenario in which the terminal exchanges information with a third-party server by using an Internet application server, the terminal exchanging information with the Internet application server by using an Internet application identifier, the third-party server exchanging information with the Internet application server by using a public identifier, the public identifier and the Internet application identifier being identifiers registered with the Internet application server, and the method including:

obtaining voice data entered by a user; and sending a service processing request to the Internet application server according to the voice data entered by the user, so that the Internet application server receives the service processing request and recognizes the voice data in the service processing request to obtain voice recognition information, and the Internet application server sends the voice recognition information and the Internet application identifier to the third-party server corresponding to the public identifier, so that the third-party server processes a corresponding service according to the voice recognition information and the Internet application identifier, the service processing request including at least the voice data, the public identifier, and the Internet application identifier.

According to a third aspect, an Internet application server is provided, including:

a first receiving module, configured to receive a service processing request sent by a terminal, the service processing request including at least voice data, a public identifier, and an Internet application identifier;

a recognition module, configured to recognize the voice data in the service processing request to obtain voice recognition information; and a first sending module, configured to send the voice recognition information and the Internet application identifier to a third-party server corresponding to the public identifier, so that the third-party server processes a corresponding service according to the voice recognition information and the Internet application identifier.

According to a fourth aspect, a terminal is provided, including:

an obtaining module, configured to obtain voice data entered by a user; and a sending module, configured to: send a service processing request to an Internet application server according to the voice data entered by the user, so that the Internet application server receives the service processing request and recognizes the voice data in the service processing request to obtain voice recognition information, and the Internet application server sends the voice recognition information and an Internet application identifier to a third-party server corresponding to a public identifier, so that the third-party server processes a corresponding service according to the voice recognition information and the Internet application identifier, the service processing request including at least the voice data, the public identifier, and the Internet application identifier.

The technical solutions provided in the embodiments of the present invention have the following beneficial effects:

A service processing request sent by a terminal is received, and voice data in the service processing request is recognized to obtain voice recognition information. The voice recognition information and an Internet application identifier are sent, according to a public identifier, to a third-party server corresponding to the public identifier, so that the third-party server processes a corresponding service according to the voice recognition information and the Internet application identifier. Therefore, Internet application-based service processing is implemented by means of exchange among an Internet application server, the terminal, and the third-party server. On the premise of satisfying a user requirement, a service processing process is relatively simple. Therefore, efficiency of service processing is relatively high.

BRIEF DESCRIPTION OF THE DRAWINGS

To describe the technical solutions in the embodiments of the present invention more clearly, the following briefly describes the accompanying drawings. The accompanying drawings in the following description show merely some example implementations of the present invention, and a person of ordinary skill in the art may derive other drawings from these accompanying drawings without creative efforts.

DESCRIPTION OF EMBODIMENTS

To make objectives, technical solutions, and advantages of the present disclosure clearer, the following further describes embodiments of the present invention in detail with reference to the accompanying drawings.

Figure 1:
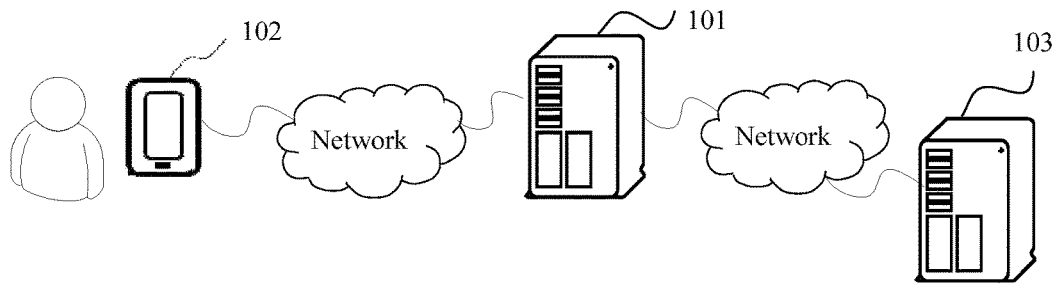
FIG. 1 is a schematic diagram of an implementation environment involved in a service processing method.

FIG. 1 is a schematic diagram of an implementation environment involved in a service processing method according to an embodiment of the present invention. As shown in FIG. 1, the implementation environment includes an Internet application server 101, a terminal 102, and a third-party server 103. The Internet application server 101 is connected to the terminal 102 by using a network, and the Internet application server 101 is connected to the third-party server 103 by using the network. The network may be a wired network, or may be a wireless network.

The method provided in this embodiment of the present invention is applied to a scenario in which the terminal 102 and the third-party server 103 process a service via the Internet application server 101. Specifically, the Internet application server 101 may provide an Internet application service to a user corresponding to the terminal 102. The third-party server 103 may establish a partnership with the Internet application server 101 in advance, to promote a product and a service thereof by using the Internet application server 101. The third-party server 103 is a server that can provide a service or a product. "Third party" is relative to "the terminal" party and "the Internet application server" party. The third-party server and the Internet application server are different servers, but it does not mean that the third-party server has to belong to an owner different from an owner of the Internet application server. For example, "the third-party server" may belong to a same owner A as that of the Internet application server, or may belong to a different owner B. The owner A and the owner B may be associated with each other, or may be independent of each other.

The terminal 102 may send an Internet application message to the third-party server 103, where the Internet application message may include a public identifier registered with the Internet application server, and the public identifier corresponds to the third-party server 103. The public identifier is an application account applied by a developer or a business on the Internet application server. The developer or the business may comprehensively push information to broad users, or communicate with or interact with broad users on the Internet application server in a manner such as a text, an image, a voice, or a video by using the public identifier.

The Internet application server 101 may be configured to be a server providing a service by using the Internet. The Internet application server 101 may be an instant messaging server or other Internet application servers, or may be a server that can implement a service such as online payment by using the Internet. A specific type of the Internet application server 101 is not limited in this embodiment of the present invention. The third-party server 103 may be a platform or server configured for providing a product or a service. The terminal 102 is a terminal that can implement an Internet application service for a user. The terminal 102 may be a desk computer, a smartphone, a tablet computer, an e-book reader, a moving picture experts group audio layer III (MP3) player, a moving picture experts group audio layer IV (MP4) player, a portable laptop computer, or a wearable device such as a smart band.

In various implementations of the present invention, after the terminal 102 sends a service processing request to the Internet application server 101, the third-party server 103 implements a service requested by the terminal 102 via the Internet application server 101. For each specific service processing implementation, refer to the following detailed descriptions.

A service processing request may include voice data. In a related technology, when a service is processed, a terminal first sends the voice data to a voice recognition server, and after receiving voice recognition information returned by the voice recognition server, sends the voice recognition information to a third-party server. The third-party server then processes a service based on the voice recognition information. Therefore, such a service processing process is relatively complex and inefficient.

Figure 2:
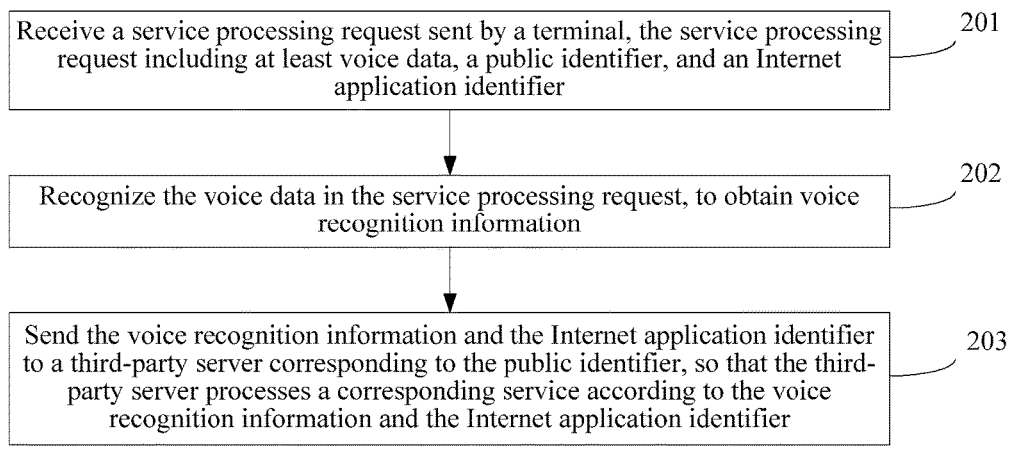
FIG. 2 is a logic flow of a service processing method.

To prevent the foregoing complexity and improve the efficiency of service processing, an implementation of the present invention provides a service processing method with reference to the implementation environment shown in FIG. 1. The method may be performed by an Internet application server, and is applied to a scenario in which a third-party server exchanges information with a terminal via the Internet application server. The terminal exchanges information with the Internet application server by using an Internet application identifier. The third-party server exchanges information with the Internet application server by using a public identifier. The public identifier and the Internet application identifier are identifiers registered with the Internet application server. Referring to FIG. 2, a process of the method provided in this implementation includes:

201: Receive a service processing request sent by a terminal, the service processing request including at least voice data, a public identifier, and an Internet application identifier.

The service processing request may further include a terminal identifier, where the terminal identifier may be an identifier registered by a user with the Internet application server. When the Internet application server is an instant messaging server, the terminal identifier may be an instant messaging account.

Some third-party servers may obtain a right or privilege to use a voice recognition d service from the Internet Application server, while some third-party servers may not have registered a right to use the voice recognition service from the Internet Application server. The third-party servers having the right to use the voice recognition function may obtain voice recognition service from the Internet application server, while the third-party servers that do not have right to use voice recognition service may not obtain voice recognition service from the Internet application server. The Internet application server may perform recognition of voice data corresponding to the third-party servers that have the voice recognition right, and may refuse to perform voice recognition of voice data corresponding to the third-party servers that do not have the voice recognition right.

Optionally, after step 201, the method further includes:
determining whether the third-party server corresponding to the public identifier has the voice recognition right; and if yes, performing Step 202; or if not, sending the voice data and the Internet application identifier to the third-party server, so that the third-party server processes a corresponding service according to the voice data and the Internet application identifier. That is, the third-party server recognizes the voice data to obtain voice recognition information, and processes the corresponding service according to the voice recognition information and the Internet application identifier.

The Internet application server stores a right list. The right list includes the public identifiers corresponding to the third-party servers that enable the voice recognition right (the right to use voice recognition service provided by the Internet Application Server). Correspondingly, the step of determining whether the third-party server corresponding to the public identifier has the voice recognition right may be:

determining whether the right list includes the public identifier; and if yes, determining that the third-party server corresponding to the public identifier has the voice recognition right; or if not, determining that the third-party server corresponding to the public identifier does not have the voice recognition right.

202: Recognize the voice data in the service processing request to obtain voice recognition information.

The Internet application server may include multiple voice recognition application programs, and may include an internal voice recognition application program, or may include a recognition application program from an external party. Different terminals may select different voice recognition application programs, and this step may be:

obtaining a voice recognition application program corresponding to the terminal; and recognizing the voice data in the service processing request by using the recognition application program to obtain the voice recognition information.

Before this step, the user may select a voice recognition application program from the multiple voice recognition application programs included in the Internet application server, and set the selected voice recognition application program as the voice recognition application program corresponding to the terminal. A specific process may be:

obtaining a voice recognition application program selected by the terminal, and storing correspondence of a terminal identifier of the terminal and a program identifier of the voice recognition application program.

Correspondingly, the step of obtaining a voice recognition application program corresponding to the terminal may be:

querying, according to the terminal identifier of the terminal, the terminal identifier and the program identifier correspondence that are stored, to obtain the voice recognition application program corresponding to the terminal identifier.

The program identifier may be a program version number and/or a program name, and the like.

203: Send the voice recognition information and the Internet application identifier to the third-party server corresponding to the public identifier, so that the third-party server processes a corresponding service request according to the voice recognition information and the Internet application identifier.

To ensure security, the third-party server stores the Internet application identifier of the Internet application server. The third-party server receives the voice recognition information and the Internet application identifier that are sent by the terminal, and performs verification on the Internet application server according to the received Internet application identifier and the stored Internet application identifier; when the verification succeeds, processes the corresponding service according to the voice recognition information; or when the verification fails, refuses to process the corresponding service.

If the stored Internet application identifier includes the received Internet application identifier, the third-party server determines that the verification on the Internet application server succeeds. If the stored Internet application identifier does not include the received Internet application identifier, the third-party server determines that the verification on the Internet application server fails.

According to the method provided in the example implementation of the present invention, a service processing request sent by a terminal is received, and voice data in the service processing request is recognized to obtain voice recognition information. The voice recognition information and an Internet application identifier are sent, according to a public identifier, to a third-party server corresponding to the public identifier, so that the third-party server processes a corresponding service according to the voice recognition information and the Internet application identifier. Therefore, Internet application-based service processing is implemented by means of exchange among an Internet application server, the terminal, and the third-party server. The service processing is relatively simple. Therefore, efficiency of service processing is improved.

In an alternative implementation, before sending the voice recognition information and the Internet application identifier to the third-party server corresponding to the public identifier, the method further includes:

generating a voice identifier corresponding to the voice data; and storing the voice data and the voice identifier corresponding to the voice data in a voice database, where sending the voice recognition information and the Internet application identifier to the third-party server corresponding to the public identifier includes:

sending the voice recognition information, the voice identifier corresponding to the voice data, and the Internet application identifier to the third-party server corresponding to the public identifier.

In another implementation, the method may further includes:

receiving a request to obtain the voice data sent by the third-party server, where the request to obtain the voice data includes at least a voice identifier and a public identifier;

querying, according to the voice identifier in the request to obtain the voice data, the stored voice data and the stored voice identifier corresponding to the voice data to obtain voice data corresponding to the voice identifier; and sending, to the third-party server corresponding to the public identifier, the voice data corresponding to the voice identifier.

Any combination of all the foregoing optional technical solutions may be used to form alternative implementations of the present invention, which is not described one by one herein.

Figure 3:
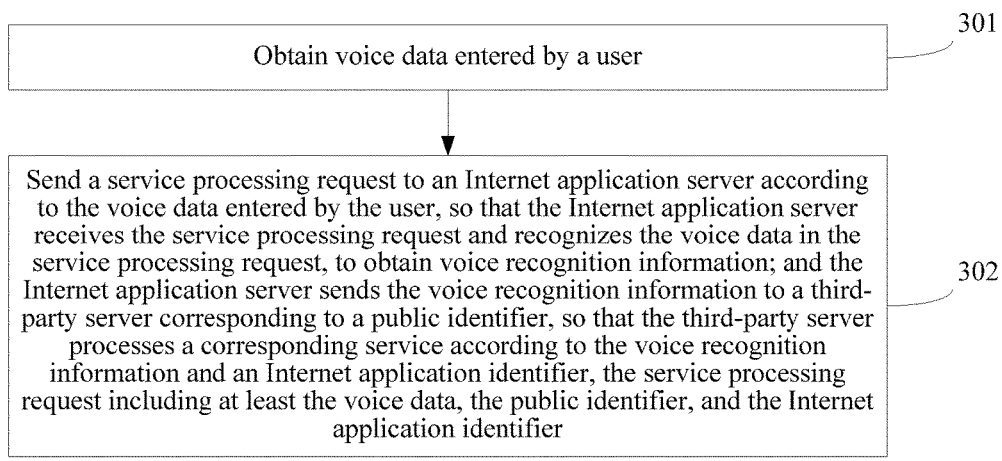
FIG. 3 is a logic flow of another service processing method.

With reference to the implementation environment shown in FIG. 1, another implementation of the present invention provides another service processing method. The method is performed by a terminal, and is applied to a scenario in which the terminal exchanges information with a third-party server via an Internet application server. The terminal exchanges information with the Internet application server by using an Internet application identifier. The third-party server exchanges information with the Internet application server by using a public identifier. The public identifier and the Internet application identifier are identifiers registered with the Internet application server. Referring to FIG. 3, a method provided by this implementation includes:

301: Obtain voice data entered by a user.

302: Send a service processing request to the Internet application server according to the voice data entered by the user, so that the Internet application server receives the service processing request and recognizes the voice data in the service processing request to obtain voice recognition information, and the Internet application server sends the voice recognition information to a third-party server corresponding to a public identifier, so that the third-party server processes a corresponding service according to the voice recognition information and an Internet application identifier, the service processing request including at least the voice data, the public identifier, and the Internet application identifier.

According to the method provided in this implementation t of the present invention, voice data entered by a user is obtained, a service processing request is sent to an Internet application server according to the voice data entered by the user, and the Internet application server receives the service processing request, and sends, to a third-party server corresponding to a public identifier, voice recognition information obtained by recognizing the voice data, so that the third-party server processes a corresponding service according to the voice recognition information and an Internet application identifier. Therefore, Internet application-based service processing is implemented by means of exchange among an Internet application server, the terminal, and the third-party server. The service processing process is relatively simple. Therefore, efficiency of service processing is improved.

In an alternative implementation, before the obtaining voice data entered by a user, the method further includes:

when a public identifier selection instruction is detected, displaying, according to the public identifier selection instruction, an information entering interface corresponding to the public identifier, where the obtaining voice data entered by a user includes:

obtaining the voice data entered by the user on the information entering interface.

In an alternative implementation, before the obtaining voice data entered by a user, the method further includes:

when a voice recognition application program selection instruction is detected, displaying a voice recognition application program selection interface according to the voice recognition application program selection instruction, where the voice recognition application program selection interface includes multiple voice recognition application programs; and obtaining a voice recognition application program selected by the user on the voice recognition application program selection interface, and sending the voice recognition application program to the Internet application server, so that the Internet application server stores a terminal identifier of the terminal and a program identifier of the voice recognition application program.

Any combination of all the foregoing optional technical solutions may be used to form an alternative implementation of the present invention, which is not described one by one herein.

With reference to the application environment shown in FIG. 1, another implementation of the present invention provides another service processing method. The method may be performed by a system including a third-party server, an Internet application server, and a terminal, and is applied to a scenario in which the third-party server exchanges information with the terminal via the Internet application server. The terminal exchanges information with the Internet application server by using an Internet application identifier.

Figure 4:
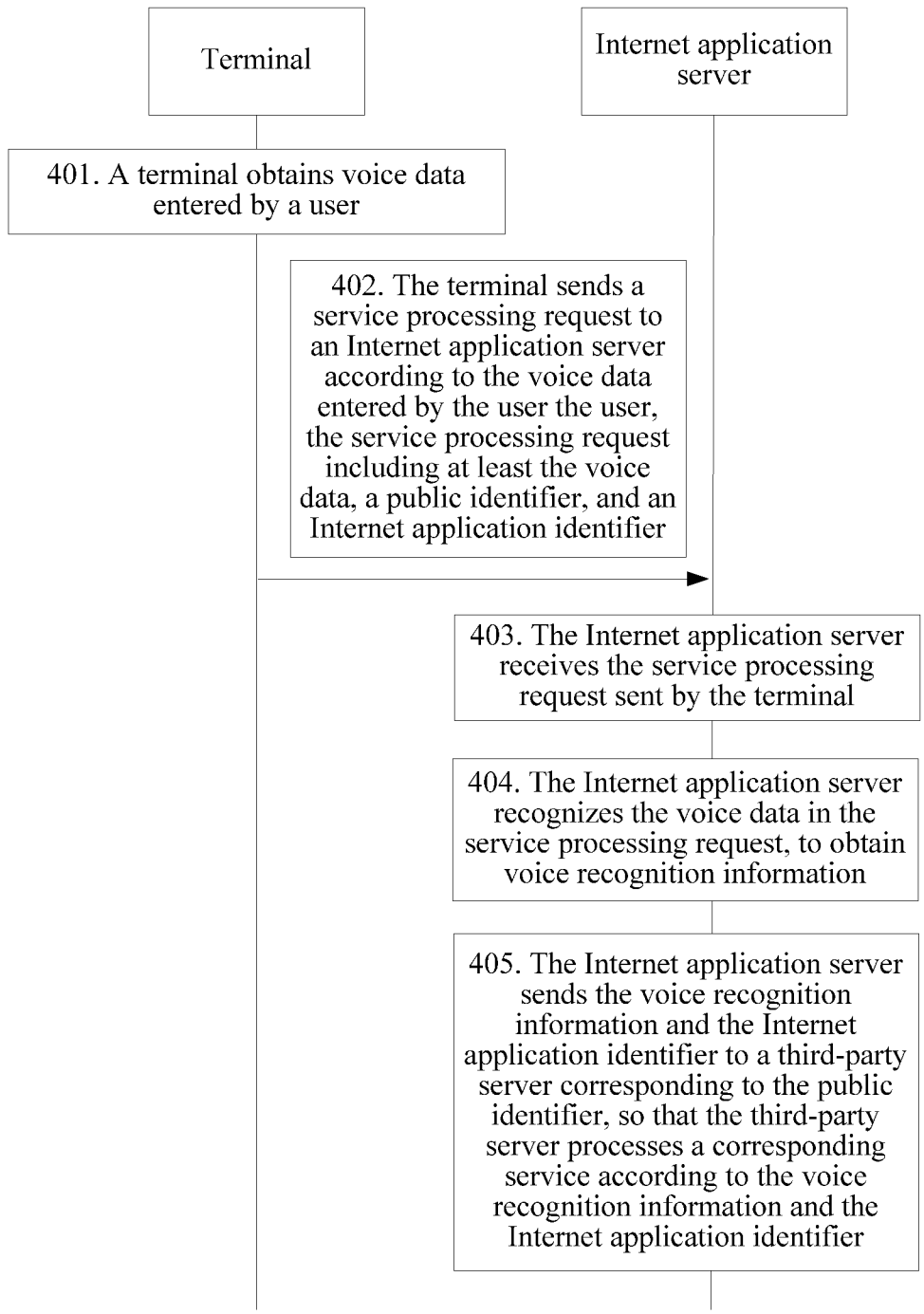
FIG. 4 is a logic flow of another service processing method.

The third-party server exchanges information with the Internet application server by using a public identifier. The public identifier and the Internet application identifier are identifiers registered with the Internet application server. Referring to FIG. 4, a process of the method provided in this embodiment includes:

401: A terminal obtains voice data entered by a user.

Because the voice data needs to be subsequently forwarded to the third-party server, the third-party server usually corresponds to the public identifier, and the user may add multiple public identifiers of multiple candidate third-party server in the terminal via the Internet application identifier. To select a public identifier to which the user prepares to send the voice data, before obtaining the voice data entered by the user, the terminal may further display the public identifiers added by the user. When a public identifier selection instruction is detected, an information entering interface corresponding to the selected public identifier is displayed according to the public identifier selection instruction. Correspondingly, the voice data entered by the user on the information entering interface of the third-party server corresponding to the selected public identifier may be obtained.

The voice data is subsequently sent to the Internet application server, and the Internet application server includes multiple voice recognition application programs. Therefore, before obtaining the voice data entered by the user, the terminal may further select a voice recognition application program from the multiple voice recognition application programs. A specific process may be:

when a voice recognition application program selection instruction is detected, displaying a voice recognition application program selection interface according to the voice recognition application program selection instruction, where the voice recognition application program selection interface includes multiple voice recognition application programs; and obtaining a voice recognition application program selected by the user on the voice recognition application program selection interface, and sending the voice recognition application program selection to the Internet application server, so that the Internet application server stores a terminal identifier of the terminal and a program identifier of the voice recognition application program.

402: The terminal sends a service processing request to the Internet application server according to the voice data entered by the user the user, the service processing request including at least the voice data, a public identifier, and an Internet application identifier.

The service processing request may be in a form of a packet. This is not specifically limited in this embodiment. For example, the service processing request may be an extensible markup language (XML) packet, where the XML packet may be the following content:

```
<xml>
<ToUserName><![CDATA[toUser]]></ToUserName>
<FromUserName><![CDATA[fromUser]]></FromUserName>
<CreateTime>1357290913</CreateTime>
<MsgType><![CDATA[voice]]></MsgType>
<MediaId><![CDATA[media_id]]></MediaId>
<Format><![CDATA[Format]]></Format>
<MsgId>1234567890123456</MsgId>
</xml>,
``` where <ToUserName> is the public identifier, <FromUserName> is the Internet application identifier, <CreateTime> is a creation time of information, <MsgType> is an information type, <MediaId> is a voice identifier corresponding to the voice data, <Format> is a format of the voice data, and <MsgId> is an identifier of the information.

A manner in which the terminal sends the service processing request to the Internet application server according to the voice data entered by the user is not specifically limited, and includes but is not limited to: sending the service processing request by using a POST request of the HyperText Transfer Protocol (HTTP). The POST request may carry the service processing request, where the service processing request includes at least the voice data, the public identifier, and the Internet application identifier. This is not specifically limited in this embodiment.

403: The Internet application server receives the service processing request sent by the terminal.

A manner in which the Internet application server receives the service processing request sent by the terminal is not specifically limited, and includes but is not limited to: receiving the service processing request sent by the terminal as a POST request.

Whether the third-party server corresponding to the public identifier has a right or privilege to use the voice recognition service of the Internet Application server is determined. If yes, Step 404 is performed. If not, the voice data and the Internet application identifier are sent to the third-party server, so that the third-party server processes the corresponding service according to the voice data and the Internet application identifier. That is, the third-party server performs the recognition of the voice data, obtains voice recognition information, and processes the corresponding service according to the voice recognition information and the Internet application identifier.

404: The Internet application server recognizes the voice data in the service processing request to obtain voice recognition information.

A voice recognition application program corresponding to the terminal is obtained. The voice data in the service processing request is recognized by using the voice recognition application program to obtain the voice recognition information.

Before this step, the user may select a voice recognition application program from the multiple voice recognition application programs included in the Internet application server, and set the selected voice recognition application program as the recognition application program corresponding to the terminal. A specific process may be:

obtaining a voice recognition application program selected by the terminal, and storing a terminal identifier of the terminal and a program identifier of the voice recognition application program.

Correspondingly, the step of obtaining a voice recognition application program corresponding to the terminal may be:

querying, according to the terminal identifier of the terminal, the terminal identifier and the program identifier that are stored, to obtain the voice recognition application program corresponding to the terminal.

A manner in which the Internet application server recognizes the voice data in the service processing request and obtains the voice recognition information is not specifically limited, and includes but is not limited to: transforming the voice data to the voice recognition information by invoking a predefined interface. The predefined interface may be a voice recognition interface, and the voice recognition interface may be associated with an established voice recognition database, so as to implement voice recognition. This is not specifically limited herein. The voice recognition information may be text information. This is not specifically limited herein either.

405: The Internet application server sends the voice recognition information and the Internet application identifier to the third-party server corresponding to the public identifier, so that the third-party server processes a corresponding service according to the voice recognition information and the Internet application identifier.

To ensure security, the third-party server stores the Internet application identifier of the Internet application server. The third-party server receives the voice recognition information and the Internet application identifier that are sent by the terminal, performs verification on the Internet application server according to the received Internet application identifier and the stored Internet application identifier; when the verification succeeds, processes the corresponding service according to the voice recognition information; or when the verification fails, refuses to process the corresponding service.

If the stored Internet application identifier includes the received Internet application identifier, the third-party server determines that the verification on the Internet application server succeeds. If the stored Internet application identifier does not include the received Internet application identifier, the third-party server determines that the verification on the Internet application server fails.

A manner in which the Internet application server sends the voice recognition information and the Internet application identifier to the third-party server corresponding to the public identifier is not specifically limited herein, and includes but is not limited to: pre-storing a table of mapping or correspondence between each public identifier and an Internet Protocol address (IP address) of a corresponding third-party server; querying, according to a public identifier, an IP address corresponding to the public identifier in the mapping table; and sending, according to the found IP address, the voice recognition information and the Internet application identifier to the third-party server corresponding to the public identifier.

The Internet application server may also send the voice recognition information and the Internet application identifier to the third-party server in a form of a packet. This is not specifically limited herein. For example, an example in which the form of the packet is an XML packet is used. An XML packet corresponding to the voice recognition information and the Internet application identifier may be the following content:

```
<xml>
  <ToUserName><![CDATA[toUser]]></ToUserName>
  <FromUserName><![CDATA[fromUser]]></FromUserName>
  <CreateTime>1357290913</CreateTime>
  <MsgType><![CDATA[voice]]></MsgType>
  <MediaId><![CDATA[media_id]]></MediaId>
  <Format><![CDATA[Format]]></Format>
  <Recognition><![CDATA[XXX]]></Recognition>
  <MsgId>1234567890123456</MsgId>
</xml>,
``` where a <Recognition><![CDATA[XXX]]></Recognition> field is voice recognition information, and an encoding manner of the voice recognition information may be encoding by using an 8-bit Unicode Transformation Format (UTF-8).

In addition, the Internet application server may send the voice recognition information and the Internet application identifier to the third-party server corresponding to the public identifier by using a POST request of the HTTP. The POST request may carry the voice recognition information and the Internet application identifier. This is not specifically limited in this embodiment.

After the Internet application server sends the voice recognition information and the Internet application identifier to the third-party server corresponding to the public identifier, the third-party server may further need to acquire the voice data. In the foregoing case, before sending, according to the public identifier, the voice recognition information and the Internet application identifier to the third-party server corresponding to the public identifier, the Internet application server may further generate a voice identifier corresponding to the voice data, and store the voice data and the voice identifier corresponding to the voice data. Correspondingly, when sending the voice recognition information and the Internet application identifier to the third-party server corresponding to the public identifier, the Internet application server may send the voice recognition information, the voice identifier corresponding to the voice data, and the Internet application identifier to the third-party server corresponding to the public identifier, so that the third-party server may subsequently obtain the voice data by using the voice identifier. The voice identifier corresponding to the voice data may be a receiving time at which the voice data is received. This is not specifically limited in this embodiment.

The implementation based on the foregoing description further provides a method for obtaining voice data by a third-party server. A specific process includes: receiving, by the Internet application server, a request to obtain the voice data sent by the third-party server, where the request to obtain the voice data includes at least a voice identifier and a public identifier; querying, according to the voice identifier in the request to obtain the voice data, the stored voice data and the stored voice identifier corresponding to the voice data, to obtain the voice data corresponding to the voice identifier; and sending the voice data corresponding to the voice identifier to the third-party server corresponding to the public identifier. Any third-party server may obtain the voice data from the Internet application server according to the foregoing process. This is not specifically limited in this embodiment.

As such, the third-party server can also obtain the voice data in addition to the voice recognition information, so that it is convenient for the third-party server to subsequently further process the voice data, so as to provide more services.

According to the method provided above, a service processing request sent by a terminal is received by an Internet application server. Voice data in the service processing request is recognized to obtain voice recognition information. The voice recognition information and an Internet application identifier are sent, according to a public identifier, to a third-party server corresponding to the public identifier, so that the third-party server processes a corresponding service according to the voice recognition information and the Internet application identifier. Therefore, Internet application-based service processing is implemented by means of exchange among an Internet application server, the terminal, and the third-party server. The service processing process is relatively simple. Therefore, efficiency of service processing is improved.

Figure 5:
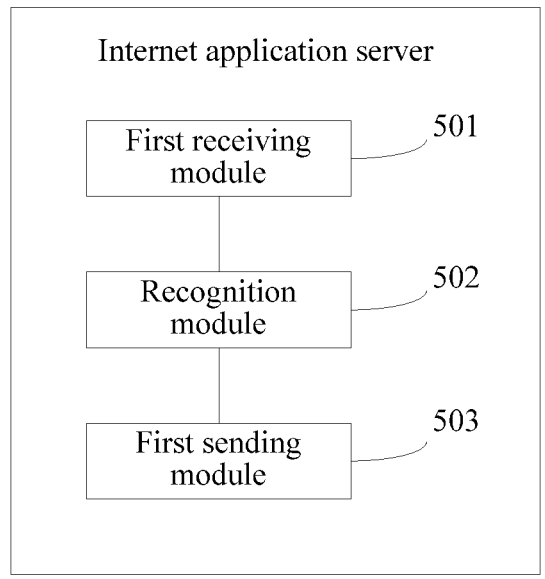
FIG. 5 is a schematic structural diagram of an Internet application server.
Figure 6:
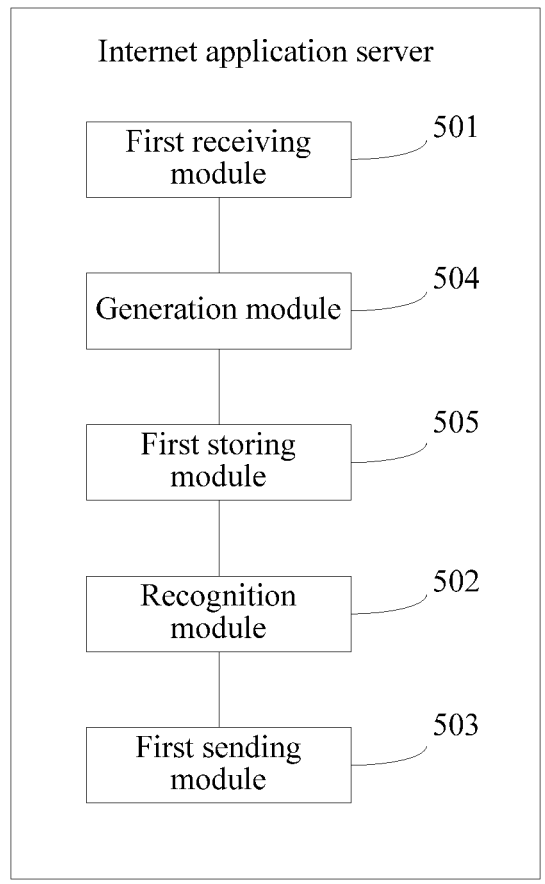
FIG. 6 is a schematic structural diagram of another Internet application server.

One implementation of the present invention provides an Internet application server. The server is configured to execute the function executed by the Internet application server in the service processing method provided in the implementations corresponding to FIG. 2 or FIG. 4. Referring to FIG. 5, the Internet application server includes:

a first receiving module 501, configured to receive a service processing request sent by a terminal, the service processing request including at least voice data, a public identifier, and an Internet application identifier;

a voice recognition module 502, configured to recognize the voice data in the service processing request to obtain voice recognition information; and a first sending module 503, configured to: send the voice recognition information and the Internet application identifier to a third-party server corresponding to the public identifier, so that the third-party server processes a corresponding service according to the voice recognition information and the Internet application identifier.

optionally, referring to FIG. 6, the Internet application server further includes:

a generation module 504, configured to generate a voice identifier corresponding to the voice data; and a first storing module 505, configured to store the voice data and the voice identifier corresponding to the voice data in a voice database, where the first sending module 503 is configured to send the voice recognition information, the voice identifier corresponding to the voice data, and the Internet application identifier to the third-party server corresponding to the public identifier.

Figure 7:
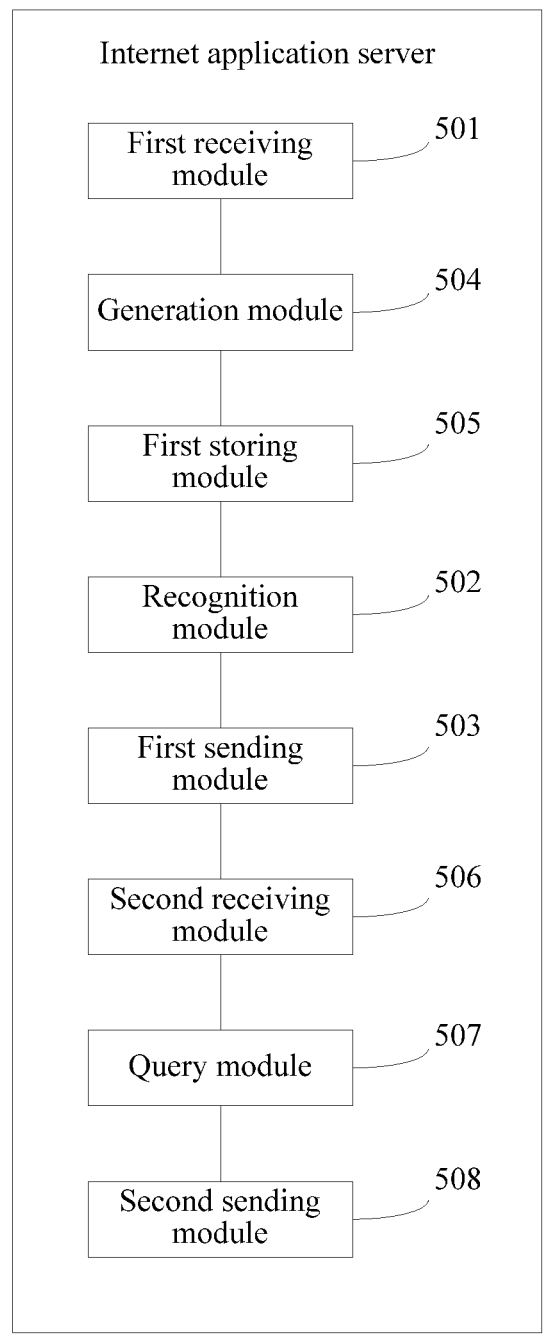
FIG. 7 is a schematic structural diagram of another Internet application server.

In another alternative implementation, referring to FIG. 7, the Internet application server further includes:

a second receiving module 506, configured to receive a request to obtain the voice data sent by the third-party server, where the request to obtain the voice data includes at least a voice identifier and a public identifier;

a query module 507, configured to query, according to the voice identifier in the request to obtain the voice data, the stored voice data and the stored voice identifier corresponding to the voice data, to obtain voice data corresponding to the voice identifier; and a second sending module 508, configured to send, to the third-party server corresponding to the public identifier, the voice data corresponding to the voice identifier.

Figure 8:
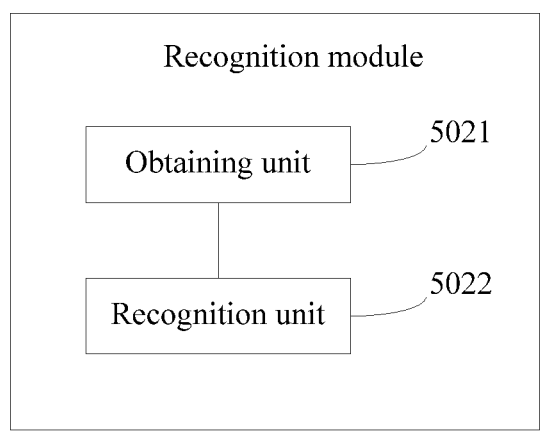
FIG. 8 is a schematic structural diagram of a recognition module.

In an example implementation, referring to FIG. 8, the recognition module 502 includes:

an obtaining unit 5021, configured to obtain a voice recognition application program corresponding to the terminal; and a recognition unit 5022, configured to recognize the voice data in the service processing request by using the voice recognition application program to obtain the voice recognition information.

Figure 9:
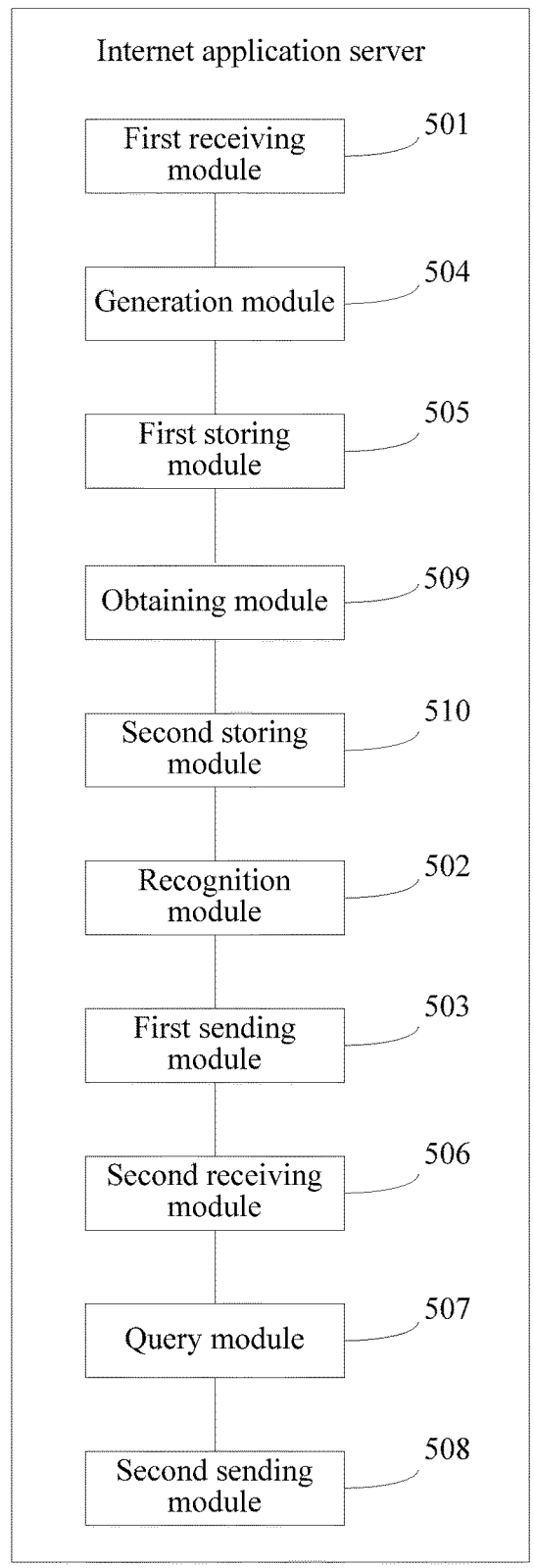
FIG. 9 is a schematic structural diagram of another Internet application server.

In another alternative implementation, referring to FIG. 9, the Internet application server further includes:

an obtaining module 509, configured to obtain a voice recognition application program selected by the terminal; and a second storing module 510, configured to store a terminal identifier of the terminal and a program identifier of the voice recognition application program, where the obtaining unit 5021 is configured to query, according to the terminal identifier of the terminal, the terminal identifier and the program identifier that are stored to obtain the voice recognition application program corresponding to the terminal.

Figure 10:
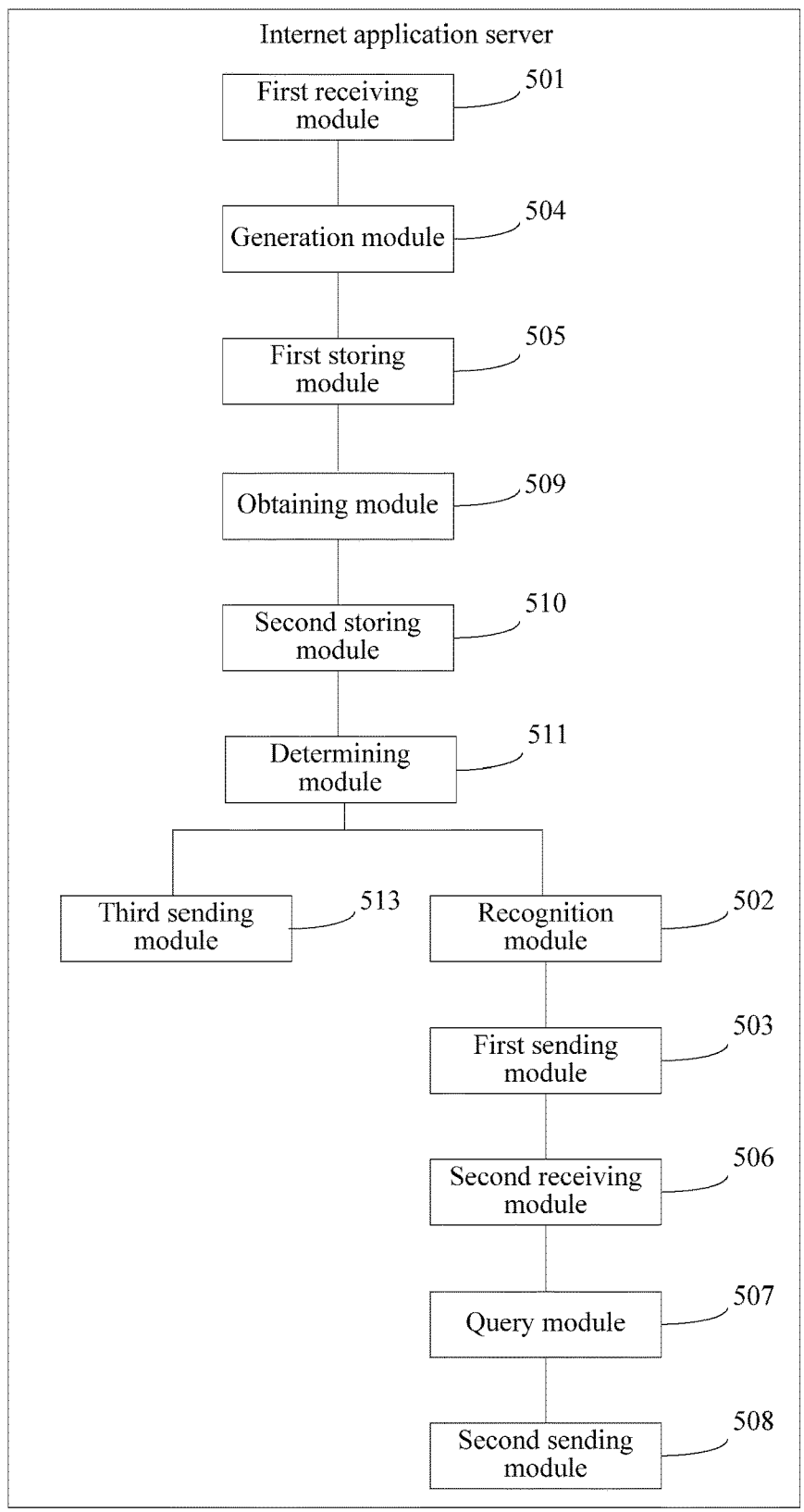
FIG. 10 is a schematic structural diagram of another Internet application server.

In another implementation, referring to FIG. 10, the Internet application server further includes:

a determining module 511, configured to determine whether the third-party server corresponding to the public identifier has a voice recognition right or privilege;

if the determining module 511 determines that the third-party server has the voice recognition right, the recognition module 502 is configured to recognize the voice data in the service processing request to obtain the voice recognition information; or if the determining module 511 determines that the third-party server does not have the voice recognition right, the third sending module 512 is configured to send the voice data and the Internet application identifier to the third-party server, so that the third-party server processes the corresponding service according to the voice data and the Internet application identifier.

According to the server provided in this example implementation, the service processing request sent by the terminal is received, and the voice data in the service processing request is recognized to obtain the voice recognition information. The voice recognition information and the Internet application identifier are sent, according to the public identifier, to the third-party server corresponding to the public identifier, so that the third-party server processes the corresponding service according to the voice recognition information and the Internet application identifier. Therefore, Internet application-based service processing is implemented by means of exchange among the Internet application server, the terminal, and the third-party server. The service processing process is relatively simple. Therefore, efficiency of service processing is improved.

Figure 11:
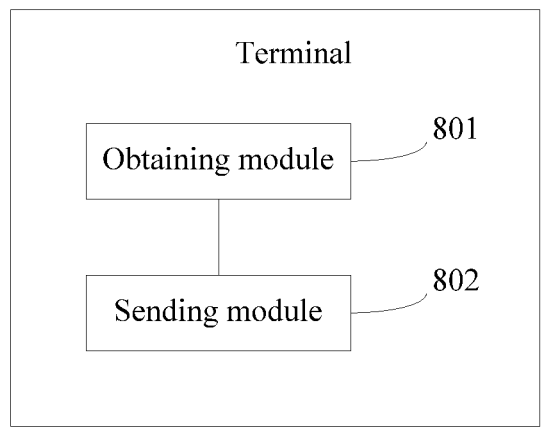
FIG. 11 is a schematic structural diagram of a terminal.

Another implementation of the present invention provides a terminal. The terminal is configured to execute the function executed by the terminal in the service processing method provided in the implementations corresponding to FIG. 3 or FIG. 4. Referring to FIG. 11, the terminal includes:

an obtaining module 801, configured to obtain voice data entered by a user; and a sending module 802, configured to: send a service processing request to an Internet application server according to the voice data entered by the user, so that the Internet application server receives the service processing request and recognizes the voice data in the service processing request to obtain voice recognition information, and the Internet application server sends the voice recognition information and an Internet application identifier to a third-party server corresponding to a public identifier, so that the third-party server processes a corresponding service according to the voice recognition information and the Internet application identifier, the service processing request including at least the voice data, the public identifier, and the Internet application identifier.

Figure 12:
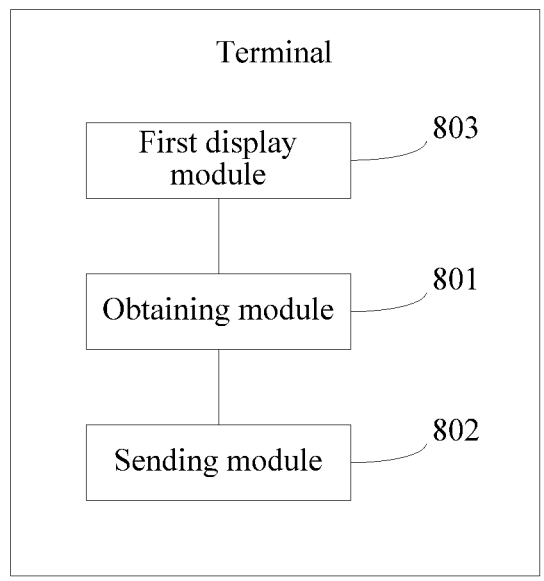
FIG. 12 is a schematic structural diagram of another terminal.

Optionally, referring to FIG. 12, the terminal further includes:

a first display module 803, configured to: when a public identifier selection instruction is detected, display, according to the public identifier selection instruction, an information entering interface corresponding to the public identifier, where the obtaining module 801 is configured to obtain the voice data entered by the user on the information entering interface.

Figure 13:
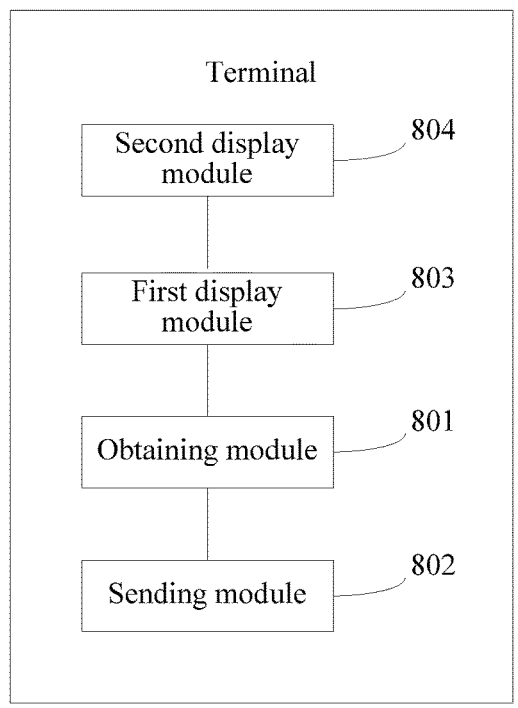
FIG. 13 is a schematic structural diagram of another terminal.

In another optional implementation, referring to FIG. 13, the terminal further includes:

a second display module 804, configured to: when a voice recognition application program selection instruction is detected, display a voice recognition application program selection interface according to the voice recognition application program selection instruction, where the voice recognition application program selection interface includes multiple voice recognition application programs, where the obtaining module 801 is further configured to obtain a voice recognition application program selected by the user on the voice recognition application program selection interface; and the sending module 802 is further configured to send the voice recognition application program to the Internet application server, so that the Internet application server stores a terminal identifier of the terminal and a program identifier of the voice recognition application program.

According to the terminal implemented above, the voice data entered by the user is obtained. The service processing request is sent to the Internet application server according to the voice data entered by the user. The Internet application server receives the service processing request, and sends, to the third-party server corresponding to the public identifier, the voice recognition information obtained by performing recognition of the voice data, so that the third-party server processes a corresponding service according to the voice recognition information and the Internet application identifier. Therefore, Internet application-based service processing is implemented by means of exchange among the Internet application server, the terminal, and the third-party server. The service processing process is relatively simple. Therefore, efficiency of service processing is improved.

Figure 14:
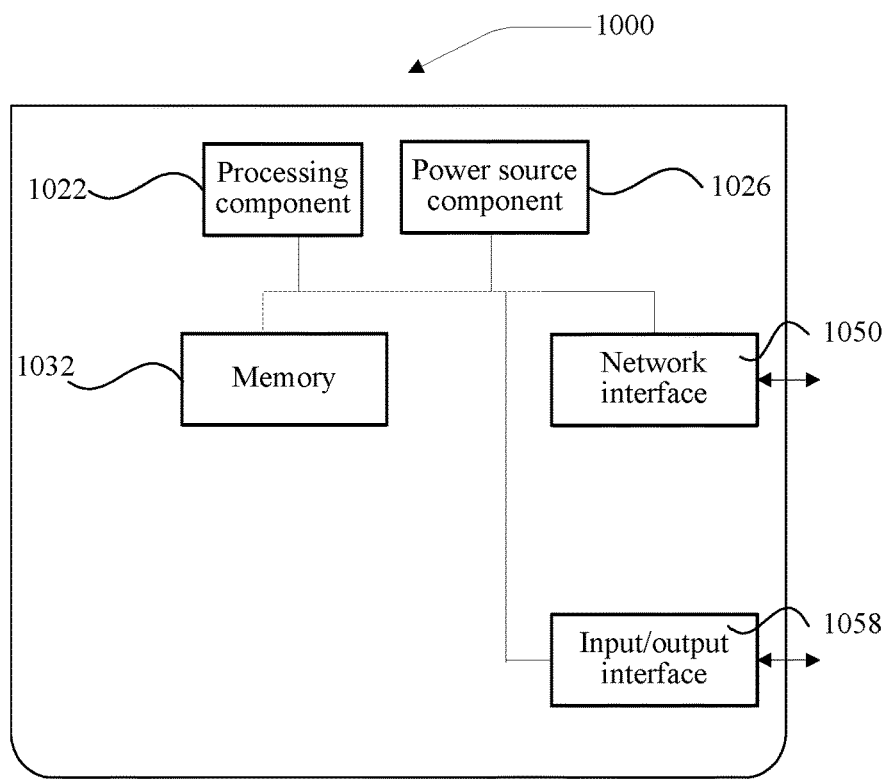
FIG. 14 is a schematic structural diagram of a server according.

FIG. 14 is a block diagram of a server 1000 according to an exemplary embodiment. Referring to FIG. 14, the server 1000 includes a processing component 1022 that further includes one or more processors, and a memory resource represented by a memory 1032, configured to store instructions that can be executed by the processing component 1022. Instructions stored in the memory for example, may be an application program. The application program stored in the memory 1032 may include one or more modules, where each module corresponds to a group of instructions. In addition, the processing component 1022 is configured to execute the instructions, so as to execute the functions of the Internet application server in performing the service processing method provided in the implementations corresponding to FIG. 2 or FIG. 4.

The server 1000 may further include: a power source component 1026, configured to execute power source management of the server 1000, a wired or wireless network interface 1050, configured to connect the server 1000 to a network, and an input/output (I/O) interface 1058. The server 1000 may run an operating system stored in the memory 1032, for example, Windows Server™, Mac OS X™, Unix™, Linux™, FreeBSD™, or the like.

According to the server provided in the implementation above, the service processing request sent by the terminal is received, and the voice data in the service processing request is recognized to obtain the voice recognition information. The voice recognition information and the Internet application identifier are sent, according to the public identifier, to the third-party server corresponding to the public identifier, so that the third-party server processes the corresponding service according to the voice recognition information and the Internet application identifier. Therefore, Internet application-based service processing is implemented by means of exchange among the Internet application server, the terminal, and the third-party server. The service processing process is relatively simple. Therefore, efficiency of service processing is improved.

An implementation of a terminal device is further provided. The terminal may be configured to execute various functions in the service processing method illustrated in FIG. 3 or FIG. 4.

Figure 15:
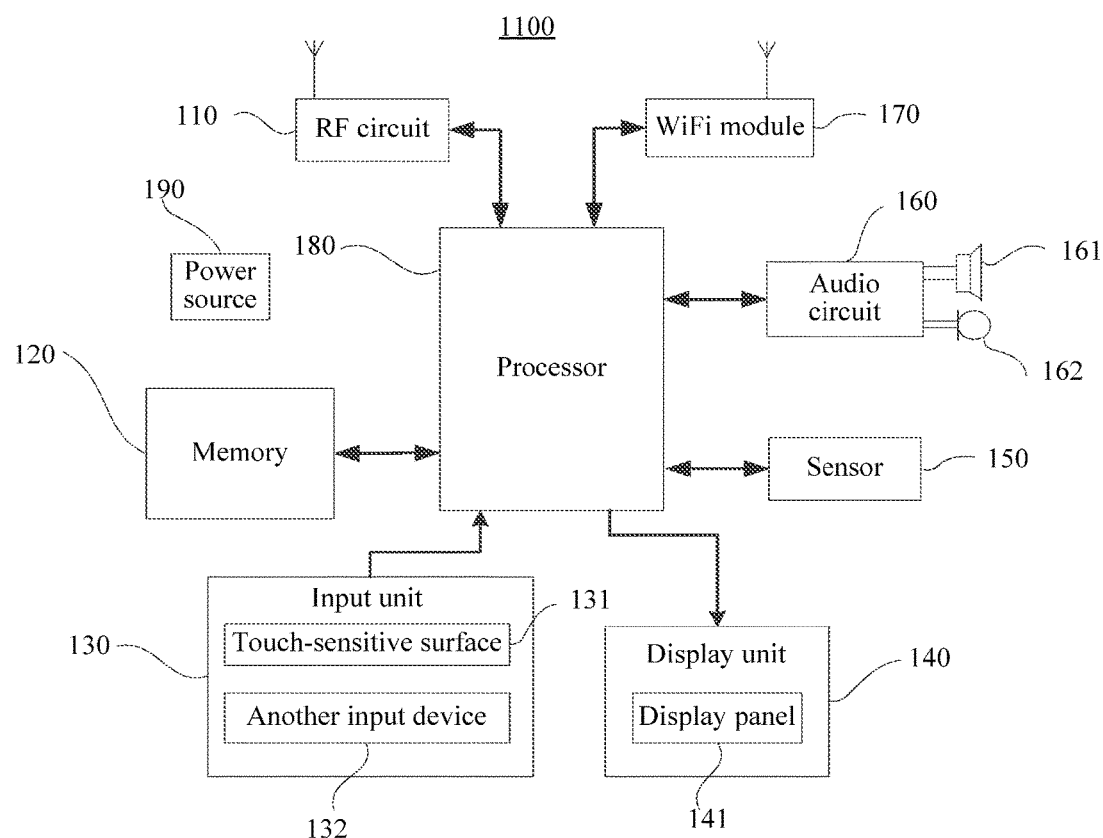
FIG. 15 is a schematic structural diagram of a terminal according.

Referring to FIG. 15, the terminal 1100 may include components such as a radio frequency (RF) circuit 110, a memory 120 including one or more computer readable storage media, an input unit 130, a display unit 140, a sensor 150, an audio circuit 160, a Wireless Fidelity (Wi-Fi) module 170, a processor 180 including one or more processing cores, and a power source 190. A person skilled in the art may understand that a terminal structure shown in FIG. 15 constitutes no limitation to the terminal, and the terminal may include more or fewer components than those shown in the figure, or some components may be combined, or a different component deployment may be used.

The RF circuit 110 may be configured to: receive and send signals during an information receiving and sending process or a call process, particularly, after receiving downlink information of a base station, deliver the downlink information of the base station to one or more processors 180 for processing, and in addition, send related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), a duplexer, and the like. In addition, the RF circuit 110 may also communicate with a network and another device by means of wireless communication. The wireless communication may use any communications standard or protocol, including but not limited to: Global System for Mobile communications (GSM), General Packet Radio Service (GPRS), Code Division Multiple Access (CDMA), Wideband Code Division Multiple Access (WCDMA), Long Term Evolution (LTE), an e-mail, a short messaging service (SMS), and the like.

The memory 120 may be configured to store a software program and module. The processor 180 runs the software program and module stored in the memory 120, to implement various functional applications and data processing. The memory 120 may mainly include a program storage area and a data storage area, where the program storage area may store an operating system, an application program required by at least one function (such as a sound play function and an image display function), and the like; and the program storage area may store data (such as audio frequency data and an address book) created according to the use of the terminal 1100, and the like. In addition, the memory 120 may include a high-speed random access memory, and may also include a non-volatile memory such as at least one disk storage device, a flash memory device, or another volatile solid-state storage device. Correspondingly, the memory 120 may further include a memory controller, to provide access of the processor 180 and the input unit 130 to the memory 120.

The input unit 130 may be configured to: receive input digit or character information, and generate a keyboard, mouse, joystick, optical, or track ball signal input related to the user setting and function control. Specifically, the input unit 130 may include a touch-sensitive surface 131 and another input device 132. The touch-sensitive surface 131, which may also be referred to as a touchscreen or a touch panel, may collect a touch operation of a user on or near the touch-sensitive surface (such as an operation of a user on or near the touch-sensitive surface 131 by using any suitable object or accessory, such as a finger or a stylus), and drive a corresponding connected apparatus according to a preset program. Optionally, the touch-sensitive surface 131 may include two parts: a touch detection apparatus and a touch controller. The touch detection apparatus detects a touch location of the user, detects a signal generated by the touch operation, and transfers the signal to the touch controller. The touch controller receives touch information from the touch detection apparatus, converts the touch information into touch point coordinates, and then sends the touch point coordinates to the processor 180. Moreover, the touch controller can receive and execute a command sent from the processor 180. In addition, the touch-sensitive surface 131 may be a resistive, capacitive, infrared, or surface sound wave type touch-sensitive surface. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, or a joystick.

The display unit 140 may be configured to display information entered by the user or information provided for the user, and various graphical user interfaces of the terminal 1100. These graphical user interfaces may be formed by a graph, a text, an icon, a video, or any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although in FIG. 15, the touch-sensitive surface 131 and the display panel 141 are used as two separate parts to implement input and output functions, in some embodiments, the touch-sensitive surface 131 and the display panel 141 may be integrated to implement the input and output functions.

The terminal 1100 may further include at least one sensor 150, for example, an optical sensor, a motion sensor and other sensors. Specifically, the optical sensor may include an ambient light sensor and a proximity sensor, where the ambient light sensor may adjust brightness of the display panel 141 according to luminance of the ambient light. The proximity sensor may switch off the display panel 141 and/or backlight when the terminal 1100 is moved to the ear of the user. As one type of motion sensor, a gravity acceleration sensor may detect magnitude of accelerations in various directions (generally on three axes), may detect magnitude and a direction of the gravity, and may be configured to identify a mobile phone gesture and orientation (for application using, for example, switchover between horizontal and vertical screens, for video game, and gesture and orientation calibration of a magnetometer), may perform a function related to vibration recognition (such as a pedometer and a knock detection), and the like. Other sensors, such as a gyroscope, a barometer, a hygrometer, a thermometer, and an infrared sensor, which may be disposed in the terminal 1100 are not further described in detail herein.

The audio circuit 160, a speaker 161, and a microphone 162 may provide an audio interface between the user and the terminal 1100. The audio circuit 160 may convert received audio data into an electric signal and transmit the electric signal to the speaker 161. The speaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 1100.

Wi-Fi is a short distance wireless transmission technology. The terminal 1100 may help, by using the Wi-Fi module 170, the user to receive and send e-mails, browse a webpage, access streaming media, and so on. Wi-Fi provides wireless broadband Internet access for the user. Although FIG. 15 shows the Wi-Fi module 170, it may be understood that the Wi-Fi module 170 is not a necessary component of the terminal 1100, and when required, the wireless communications unit may be omitted as long as the scope of the essence of the present disclosure is not changed.

The processor 180 is a control center of the terminal 1100, and is connected to various parts of the mobile phone by using various interfaces and lines. By running or executing the software program and/or module stored in the memory 120, and invoking data stored in the memory 120, the processor 180 executes various functions of the terminal 1100 and processes data, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that the foregoing modem processor may not be integrated into the processor 180.

The terminal 1100 further includes the power source 190 (for example, a battery) that supplies power to various components. Preferably, the power source may be logically connected to the processor 180 by using a power management system, so as to implement a function such as charging, discharging, and power consumption management by using the power management system. The power source 190 may further include one or more of a direct current or alternate current power source, a re-charging system, a power source fault detection circuit, a power source converter or an inverter, a power source charge state indicator, or any other components.

Although not shown in the figure, the terminal 1100 may further include a camera, a Bluetooth module, and the like, and details are not described herein.

In one implementation, the display unit of the terminal is a touchscreen display, and the terminal further includes a memory and one or more programs. The one or more programs are stored in the memory and configured to be executed by one or more processors. The one or more programs include an instruction used for executing the following operations:

obtaining voice data entered by a user; and sending a service processing request to the Internet application server according to the voice data entered by the user, so that the Internet application server receives the service processing request and recognizes the voice data in the service processing request to obtain voice recognition information, and the Internet application server sends the voice recognition information and the Internet application identifier to the third-party server corresponding to the public identifier, so that the third-party server processes a corresponding service according to the voice recognition information and the Internet application identifier, the service processing request including at least the voice data, the public identifier, and the Internet application identifier.

Assuming that the foregoing is a first possible implementation manner, in a second possible implementation manner that is provided based on the first possible implementation manner, the memory of the terminal further includes an instruction for executing the following operations:

when a public identifier selection instruction is detected, displaying, according to the public identifier selection instruction, an information entering interface corresponding to the public identifier, where the obtaining voice data entered by a user includes:

obtaining the voice data entered by the user on the information entering interface.

In a third possible implementation manner that is provided based on the first possible implementation manner, the memory of the terminal further includes an instruction for executing the following operations:

when a voice recognition application program selection instruction is detected, displaying a voice recognition application program selection interface according to the voice recognition application program selection instruction, where the voice recognition application program selection interface includes multiple voice recognition application programs; and obtaining a voice recognition application program selected by the user on the recognition application program selection interface, and sending the voice recognition application program to the Internet application server, so that the Internet application server stores a terminal identifier of the terminal and a program identifier of the voice recognition application program.

According to the terminal provided in the implementation above, the voice data entered by the user is obtained. The service processing request is sent to the Internet application server according to the voice data entered by the user. The Internet application server receives the service processing request, and sends, to the third-party server corresponding to the public identifier, the voice recognition information obtained by recognizing the voice data, so that the third-party server processes a corresponding service according to the voice recognition information and the Internet application identifier. Therefore, Internet application-based service processing is implemented by means of exchange among an Internet application server, the terminal, and the third-party server. The service processing process is relatively simple. Therefore, efficiency of service processing is improved.

Another implementation of the present invention further provides a computer readable storage medium, where the computer readable storage medium may be a computer readable storage medium included in the memory in the foregoing implementations; or may be a stand-alone computer readable storage medium. The computer readable storage medium stores one or more programs, where the one or more programs are executed by one or more processors, to implement a service processing method. The method includes:

obtaining voice data entered by a user; and sending a service processing request to the Internet application server according to the voice data entered by the user, so that the Internet application server receives the service processing request and recognizes the voice data in the service processing request, to obtain voice recognition information, and the Internet application server sends the voice recognition information and the Internet application identifier to the third-party server corresponding to the public identifier, so that the third-party server processes a corresponding service according to the voice recognition information and the Internet application identifier, the service processing request including at least the voice data, the public identifier, and the Internet application identifier.

Assuming that the foregoing is a first possible implementation manner, in a second possible implementation manner that is provided based on the first possible implementation manner, before the obtaining voice data entered by a user, the method further includes:

when a public identifier selection instruction is detected, displaying, according to the public identifier selection instruction, an information entering interface corresponding to the public identifier, where the obtaining voice data entered by a user includes:

obtaining the voice data entered by the user on the information entering interface.

In a third possible implementation manner that is provided based on the first possible implementation manner, before the obtaining voice data entered by a user, the method further includes:

when a voice recognition application program selection instruction is detected, displaying a voice recognition application program selection interface according to the voice recognition application program selection instruction, where the voice recognition application program selection interface includes multiple voice recognition application programs; and obtaining a voice recognition application program selected by the user on the recognition application program selection interface, and sending the voice recognition application program to the Internet application server, so that the Internet application server stores a terminal identifier of the terminal and a program identifier of the voice recognition application program.

According to the computer readable storage medium provided in this implementation of the present invention, the voice data entered by the user is obtained. The service processing request is sent to the Internet application server according to the voice data entered by the user. The Internet application server receives the service processing request, and sends, to the third-party server corresponding to the public identifier, the voice recognition information obtained by recognizing the voice data, so that the third-party server processes a corresponding service according to the voice recognition information and the Internet application identifier. Therefore, Internet application-based service processing is implemented by means of exchange among the Internet application server, the terminal, and the third-party server. The service processing process is relatively simple. Therefore, efficiency of service processing is improved.

Another implementation of the present invention provides a graphical user interface, where the graphical user interface is used on a terminal, the terminal includes a touchscreen display, a memory, and one or more processors configured to execute one or more programs, and the graphical user interface includes:

obtaining voice data entered by a user; and sending a service processing request to the Internet application server according to the voice data entered by the user, so that the Internet application server receives the service processing request and recognizes the voice data in the service processing request, to obtain voice recognition information, and the Internet application server sends the voice recognition information and the Internet application identifier to the third-party server corresponding to the public identifier, so that the third-party server processes a corresponding service according to the voice recognition information and the Internet application identifier, the service processing request including at least the voice data, the public identifier, and the Internet application identifier.

The graphical user interface further includes:
when a public identifier selection instruction is detected, displaying, according to the public identifier selection instruction, an information entering interface corresponding to the public identifier, where
the obtaining voice data entered by a user includes:
obtaining the voice data entered by the user on the information entering interface.

The graphical user interface further includes:
when a recognition application program selection instruction is detected, displaying a recognition application program selection interface according to the recognition application program selection instruction, where the recognition application program selection interface includes multiple recognition application programs; and
obtaining a voice recognition application program selected by the user on the voice recognition application program selection interface, and sending the voice recognition application program to the Internet application server, so that the Internet application server stores a terminal identifier of the terminal and a program identifier of the voice recognition application program.

According to the graphical user interface provided in this implementation of the present invention, the voice data entered by a user is obtained. The service processing request is sent to the Internet application server according to the voice data entered by the user. The Internet application server receives the service processing request, and sends, to the third-party server corresponding to the public identifier, the voice recognition information obtained by recognizing the voice data. The third-party server processes the corresponding service according to the voice recognition information and the Internet application identifier. Therefore, Internet application-based service processing is implemented by means of exchange among an Internet application server, the terminal, and the third-party server. The service processing process is relatively simple. Therefore, efficiency of service processing is improved.

It should be noted that when the server provided in the foregoing implementations processes a service, classification of the functional modules is only for exemplary purpose. In a practical application, the foregoing functions may be allocated to and implemented by different functional modules according to needs. That is, an inner structure of the server is divided into different functional modules, so as to perform all or some of the functions described above. In addition, the e implementations of the server, the terminal, and the service processing method that are provided following similar underlying principles. For a specific implementation process, refer to the method implementations. Details are not described herein again.

A person of ordinary skill in the art understands that all or some of the steps above may be implemented by using hardware, or may be implemented by using a program by instructing related hardware. The program may be stored in a computer readable storage medium. The storage medium may be a read-only memory, a magnetic disk, or an optical disc.

The foregoing descriptions are merely preferred embodiments of the present invention, but are not intended to limit the present disclosure. Any modification, equivalent replacement, and improvement made without departing from the spirit and principle of the present disclosure shall fall within the protection scope of the present disclosure.

What is claimed is:

1. A service processing method, used by an Internet service aggregation and dispatching server, wherein a service-rendering server exchanges information indirectly with a terminal via the Internet service aggregation and dispatching server, the Internet service aggregation and dispatching server including one or more processors and a memory storing instructions and in communication with the one or more processors, the terminal exchanging information with the Internet service aggregation and dispatching server by using an Internet application identifier, the service-rendering server exchanging information with the Internet service aggregation and dispatching server by using a public identifier, the public identifier and the Internet application identifier being identifiers registered with the Internet service aggregation and dispatching server, and the method comprising:
maintaining, by the Internet service aggregation and dispatching server, a registration list of service-rendering servers corresponding to public identifiers;
receiving, directly, by the Internet service aggregation and dispatching server, a service processing request sent by the terminal without the service processing request being passed through the service-rending server, the service processing request comprising at least voice data, the public identifier identifying the service-rendering server, and the Internet application identifier identifying a service application running on the service-rendering server;
recognizing, by the Internet service aggregation and dispatching server, the voice data in the service processing request, to obtain voice recognition information;
identifying the service-rendering server according to the public identifier; and
sending, by the Internet service aggregation and dispatching server, the voice recognition information and the Internet application identifier to the service-rendering server corresponding to the public identifier, so that the service-rendering server processes a corresponding service by running the service application identified by the internet application identifier according to the voice recognition information;
wherein the service aggregation and dispatching server functions as an intermediate station between the terminal and the service-rendering server;
wherein the service rendering server does not receive the service processing request directly from the terminal; and
wherein the service-rendering server receives the voice recognition information rather than the voice data.

2. The method according to claim 1, before the sending the voice recognition information and the Internet application identifier to the service-rendering server corresponding to the public identifier, further comprising:
generating a voice identifier corresponding to the voice data; and
storing the voice data and the voice identifier corresponding to the voice data in a voice database,
wherein sending the voice recognition information and the Internet application identifier to the service-rendering server corresponding to the public identifier comprises:
sending the voice recognition information, the voice identifier corresponding to the voice data, and the Internet application identifier to the service-rendering server corresponding to the public identifier.

3. The method according to claim 2, further comprising:
receiving a request to obtain the voice data from the service-rendering server, wherein the request to obtain the voice data comprises at least a querying voice identifier and a querying public identifier;
querying, according to the querying voice identifier in the request to obtain the voice data, the voice database, to obtain the voice data corresponding to the querying voice identifier; and
sending, to the service-rendering server corresponding to the public identifier, the voice data corresponding to the querying voice identifier.

4. The method according to claim 1, wherein recognizing the voice data in the service processing request, to obtain voice recognition information comprises:
obtaining a voice recognition application program corresponding to the terminal; and
recognizing the voice data in the service processing request by using the voice recognition application program to obtain the voice recognition information.

5. The method according to claim 4, before receiving the service processing request sent by the terminal, further comprising:
obtaining a pre-selected voice recognition application program selected by the terminal, and storing a terminal identifier of the terminal and a program identifier of the pre-selected voice recognition application program, wherein
the obtaining a voice recognition application program corresponding to the terminal comprises:
querying, according to the terminal identifier of the terminal, the terminal identifier and the program identifier that are stored, to obtain the voice recognition application program corresponding to the terminal.

6. The method according to claim 1, before recognizing the voice data in the service processing request, to obtain voice recognition information, further comprising:
determining whether the service-rendering server corresponding to the public identifier has a voice recognition service right; and
if yes, performing the step of recognizing the voice data in the service processing request, to obtain voice recognition information, and if no, sending the voice data and the Internet application identifier to the service-rendering server, so that the service-rendering server processes the corresponding service by running the service application identified by the internet application identifier according to the voice data.

7. A service processing method, used by a terminal, applied to a scenario in which the terminal exchanges information indirectly with a service-rendering server by using an Internet service aggregation and dispatching server, the terminal exchanging information with the Internet service aggregation and dispatching server by using an Internet application identifier, the service-rendering server exchanging information with the Internet service aggregation and dispatching server by using a public identifier, the public identifier and the Internet application identifier being identifiers registered with the Internet service aggregation and dispatching server, and the method comprising:
obtaining voice data entered by a user; and
sending a service processing request, directly and without the service processing request being passed through the service-rending server, to the Internet service aggregation and dispatching server so that the Internet service aggregation and dispatching server receives the service processing request and recognizes the voice data in the service processing request to obtain voice recognition information, and the Internet service aggregation and dispatching server sends the voice recognition information and the Internet application identifier to the service-rendering server corresponding to the public identifier, so that the service-rendering server processes a corresponding service according to the voice recognition information and the Internet application identifier, the service processing request comprising at least the voice data, the public identifier, and the Internet application identifiers;
wherein the service aggregation and dispatching server functions as an intermediate station between the terminal and the service-rendering server;
wherein the service rendering server does not receive the service processing request directly from the terminal; and
wherein the service-rendering server receives the voice recognition information rather than the voice data.

8. The method according to claim 7, before obtaining the voice data entered by a user, further comprising:
when a public identifier selection instruction is detected, displaying, according to the public identifier selection instruction, an information entering interface corresponding to the public identifier, and
wherein obtaining voice data entered by a user comprises obtaining the voice data entered by the user on the information entering interface.

9. The method according to claim 7, before obtaining the voice data entered by a user, further comprising:
when a voice recognition application program selection instruction is detected, displaying a voice recognition application program selection interface according to the voice recognition application program selection instruction, wherein the voice recognition application program selection interface comprises multiple voice recognition application programs; and
obtaining a voice recognition application program selected by the user on the voice recognition application program selection interface, and sending the voice recognition application program to the Internet service aggregation and dispatching server, so that the Internet service aggregation and dispatching server stores a terminal identifier of the terminal and a program identifier of the voice recognition application program.

10. An Internet service aggregation and dispatching server, comprising:
one or more processors; and
a memory storing instructions and in communication with the one or more processors,
wherein the one or more processors, when executing the instructions, are configured to:
maintain a registration list of service-rendering servers corresponding to public identifiers;
receive, directly, a service processing request sent by a terminal without the service processing request being passed through the service-rending server, the service processing request comprising at least voice data, a public identifier identifying a service-rendering server, and an Internet application identifier identifying a service application running on the service-rendering server;
recognize the voice data in the service processing request to obtain voice recognition information; and send the voice recognition information and the Internet application identifier to the service-rendering server corresponding to the public identifier, so that the service-rendering server processes a corresponding service by running the service application identified by the internet application identifier according to the voice recognition information;

wherein the service aggregation and dispatching server functions as an intermediate station between the terminal and the service-rendering server;

wherein the service rendering server does not receive the service processing request directly from the terminal; and wherein the service-rendering server receives the voice recognition information rather than the voice data.

11. The Internet service aggregation and dispatching server according to claim 10, wherein the one or more processors, when executing the instructions, are further configured to:

generate a voice identifier corresponding to the voice data; and store the voice data and the voice identifier corresponding to the voice data in a voice database, wherein the one or more processors, when executing the instructions to send the voice recognition information and the Internet application identifier to a service-rendering server, are configured to send, according to the public identifier, the voice recognition information, the voice identifier corresponding to the voice data, and the Internet application identifier to the service-rendering server corresponding to the public identifier.

12. The Internet service aggregation and dispatching server according to claim 11, wherein one or more processors, when executing the instructions, are further configured to:

receive a request to obtain the voice data sent by the service-rendering server, wherein the request to obtain the voice data comprises at least a querying voice identifier and a querying public identifier;

query, according to the voice identifier in the request to obtain the voice data, the voice database, to obtain the voice data corresponding to the querying voice identifier; and send, to the service-rendering server corresponding to the public identifier, the voice data corresponding to the querying voice identifier.

13. The Internet service aggregation and dispatching server according to claim 10, wherein the one or more processors, when executing the instructions to recognize the voice data in the service processing request, are configured to:

obtain a voice recognition application program corresponding to the terminal; and recognize the voice data in the service processing request by using the voice recognition application program to obtain the voice recognition information.

14. The Internet service aggregation and dispatching server according to claim 13, wherein the one or more processors, when executing the instructions, are further configured to:

obtain a pre-selected voice recognition application program selected by the terminal; and store a terminal identifier of the terminal and a program identifier of the pre-selected voice recognition application program, wherein the one or more processors, when executing the instructions to obtain a voice recognition application program corresponding to the terminal, are configured to query, according to the terminal identifier of the terminal, the terminal identifier and the program identifier that are stored to obtain the voice recognition application program corresponding to the terminal.

15. The Internet service aggregation and dispatching server according to claim 10, wherein the one or more processors, when executing the instructions, are further configured to:

determine whether the service-rendering server corresponding to the public identifier has a voice recognition service right, wherein if it is determined that the service-rendering server has the voice recognition service right, the one or more processors, when executing the instructions, are configured to recognize the voice data in the service processing request to obtain the voice recognition information; or if it is determined that the service-rendering server does not have the voice recognition service right, the one or more processors, when executing the instructions, are configured to send the voice data and the Internet application identifier to the service-rendering server, so that the service-rendering server processes the corresponding service by running the service application identified by the internet application identifier according to the voice data.

16. A terminal, comprising:

one or more processors;

a memory storing instructions and in communication with the one or more processors;

wherein the one or more processors, when executing the instructions, are configured to:

obtain voice data entered by a user; and send a service processing request, directly and without the service processing request being passed through the service-rending server, to an Internet service aggregation and dispatching server according to the voice data entered by the user, so that the Internet service aggregation and dispatching server receives the service processing request and recognizes the voice data in the service processing request to obtain voice recognition information, and the Internet service aggregation and dispatching server sends the voice recognition information and an Internet application identifier to a service-rendering server corresponding to a public identifier, so that the service-rendering server processes a corresponding service according to the voice recognition information and the Internet application identifier, the service processing request comprising at least the voice data, the public identifier, and the Internet application identifiers;

wherein the service aggregation and dispatching server functions as an intermediate station between the terminal and the service-rendering server;

wherein the service rendering server does not receive the service processing request directly from the terminal; and wherein the service-rendering server receives the voice recognition information rather than the voice data.

17. The terminal according to claim 16, wherein the one or more processors, when executing the instructions, are further configured:

when a public identifier selection instruction is detected, display, according to the public identifier selection instruction, an information entering interface corresponding to the public identifier; and wherein the one or more processors, when executing the instructions to obtain the voice data entered by the user, are configured to obtain the voice data entered by the user on the information entering interface.

18. The terminal according to claim 16, wherein the one or more processors, when executing the instructions, are further configured:

when a voice recognition application program selection instruction is detected, display a voice recognition application program selection interface according to the voice recognition application program selection instruction, wherein the voice recognition application program selection interface comprises multiple voice recognition application programs, wherein the one or more processors, when executing the instructions to obtain the voice recognition application program are further configured to obtain a voice recognition application program selected by the user on the voice recognition application program selection interface, and when executing the instructions to send the service processing request, are configured to send the voice recognition application program to the Internet service aggregation and dispatching server, so that the Internet service aggregation and dispatching server stores a terminal identifier of the terminal and a program identifier of the voice recognition application program.

* * * * *